Sept. 25, 1934.  A. E. EVANS  1,974,533
PUMP VALVE
Filed July 16, 1931
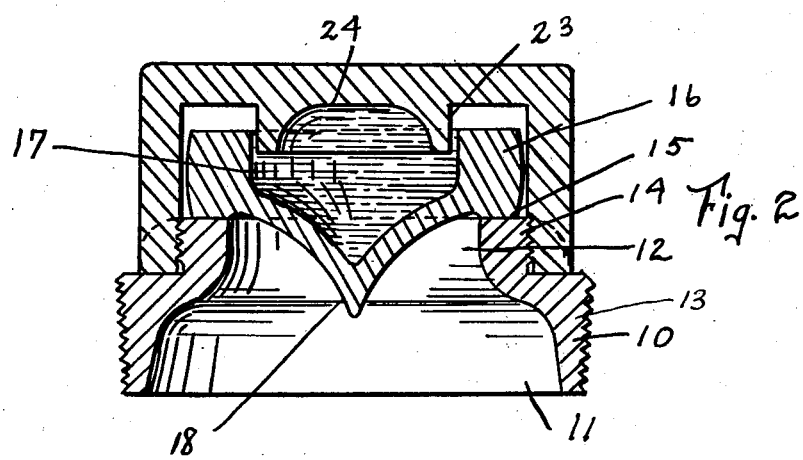
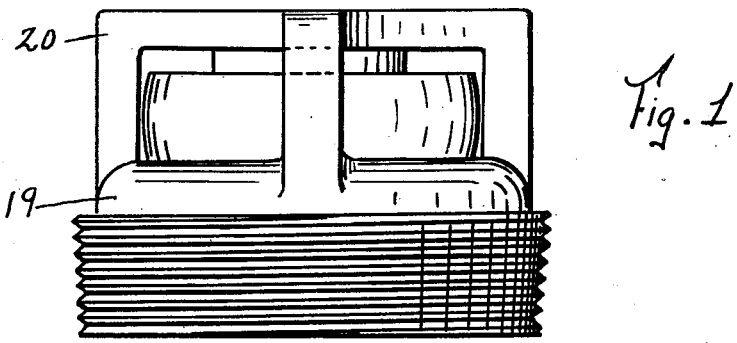
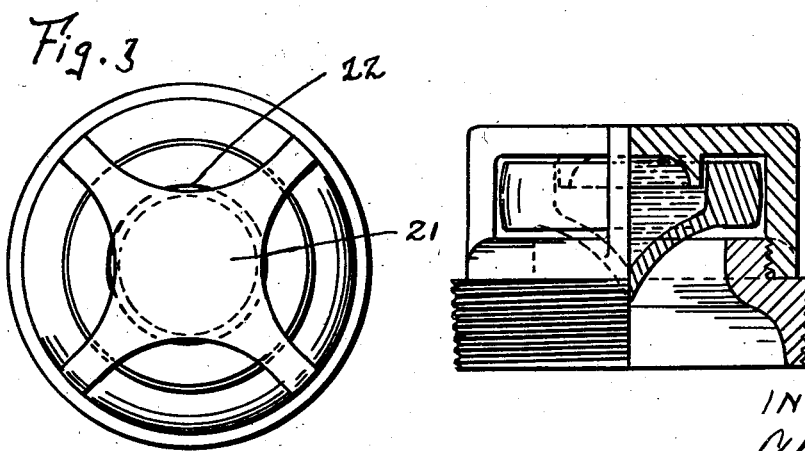
INVENTOR.
Alfred E. Evans Patented Sept. 25, 1934

1,974,533

UNITED STATES PATENT OFFICE

1,974,533

PUMP VALVE

Alfred E. Evans, Long Beach, Calif.

Application July 16, 1931, Serial No. 551,090

8 Claims. (Cl. 251—128)

This invention relates primarily to improvements in the valve construction whereby the use of stems, springs and the like is eliminated.

Another object consists in providing a dash-pot or shock-absorbing mechanism for the valve proper whereby the upward or opening movement of the valve is checked or retarded and undue distortion and injury to the valve member and cage is prevented.

A still further object is to provide a valve so constructed as to divert the liquid flowing therethrough through the outlet opening in such a manner as to eliminate or greatly reduce the friction whereby a greater capacity is provided.

Other objects and advantages will appear herein and while I have shown and will describe the preferred form of my invention, it will be understood that I do not limit myself to such preferred form but that various changes and adaptations may be made therein without departing from the spirit of my invention.

In the drawing accompanying and forming a part hereof:

Figure 1 is a side elevation of my invention detached from its place of use.

Figure 2 is a central vertical section through Figure 1.

Figure 3 is a top plan of Figure 1 on a reduced scale.

Figure 4 is a side elevation partly in section of my device showing the valve in its opened or operative position.

Referring to the drawing, 10 indicates the body of my device which is cylindrical in top plan having large and small communicating openings 11 and 12 respectively. The opening in 11 is surrounded by an exteriorly screw threaded flange 13 and the opening 12 is surrounded by an exteriorly screw threaded flange 14 of smaller diameter than the flange 13 and the upper edge of this flange 14 is formed into a flat valve seat 15.

My valve comprises an annular disc 16 provided with a central concentric cup-shaped recess 17 in the upper face thereof and provided centrally of the lower face thereof with a downwardly depending substantially inverted cone-shaped projection 18, the walls of which are curved upwardly when the valve is in its raised or opened position, as best shown in Figure 4, whereby to deflect the flow of fluid out through the openings in the cage. This cage construction comprises an annular ring portion 19 interiorly screw threaded for engagement with the exterior threads of the flange 14 and extending upwardly from this ring are four equally spaced arms 20 which arms extend upwardly for a suitable distance and then extend inwardly and terminate in a central disc portion 21. It will be noted that this disc portion 21 is of a size slightly smaller in diameter than the interior of the cup 17 to provide openings 22 for the escape of the fluid from the interior of said cup as hereinafter explained.

Depending downwardly from the disc 21 is a concentric flange 23 the interior of which forms a downwardly opening cup-shaped recess 24, the exterior diameter of flange 23 being slightly less than the diameter of the recess 17, the object of which will be obvious. The disc 16 is slightly smaller in diameter than the distance between the opposed arms 20, and the outer periphery thereof is curved on a true radius, the object of this being to prevent locking or jamming of the disc in the event the same should not move upwardly parallel with its seat.

In the operation of my valve, it being understood that as the valve is opened by the suction and fluid drawn therethrough some of the fluid will accumulate in the cup 17 and as the valve moves upwardly, coaction of the downwardly depending cup member 24 will produce a hydraulic braking action to not only snub the opening action of the valve but to prevent too sudden stopping of the valve in its upward movement and thus avoid damage to the parts of my device.

Having described my invention what I claim is:

1. In a valve, the combination of a seat member having two exteriorly threaded portions of different diameters, but coaxial with each other, the outer end of the smaller portion forming a valve seat, a valve mounted thereon and having its upper surface dished to provide a concentric fluid receptacle, and a valve retaining spider in screw threaded engagement with the smaller exterior screw threaded portion of said member having a top wall disposed in spaced parallel relation with said valve seat and having a downwardly depending cup-shaped member on the lower face of said top wall, adapted for cooperation with the dished recess in said valve to form a fluid check for said valve during its upward movement.

2. In a valve, the combination of a seat member having coaxial large and small communicating openings in opposite ends, the large opening being the inlet opening and the small opening being the outlet opening, the portion of said member surrounding the outlet being of less diameter than the portion surrounding the inlet, both of said portions being exteriorly screw threaded, a valve retaining cage in screw threaded engagement with the outlet portion of said member having a top wall disposed in spaced parallel relation with the upper end of said outlet portion and having a downwardly depending cup-shaped member in the top wall thereof, a valve mounted in said cage adapted to close the upper end of said outlet opening, having a concentric recess in the upper face thereof adapted to cooperate with the downwardly depending cup-shaped member to form a fluid check for said valve during its opening movement.

3. In a pump valve, the combination of a seat member having two portions of different exterior diameters but coaxial with each other, the outer end of the smaller portion forming a valve seat; a valve mounted thereon having its upper face cupped to form a concentric fluid receptacle and its extreme periphery formed on a radius in a plane at a right angle to its contact face; and a valve retaining spider in removable engagement with the smaller exterior diameter portion of said seat member having a centrally closed top wall disposed in spaced parallel relation to said valve seat and a downwardly depending inverted cup shaped portion on the lower face of said top wall adapted for cooperation with the cup in the valve to form a fluid check for said valve during its upward movement.

4. In a pump valve, a valve seat, a cage mounted thereover comprising an annulus with arms extending upwardly from said annulus and terminating in radially inturned portions, a disc supported from the inturned portions of said arms in spaced relation to said valve seat, a downwardly depending inverted cup on the under face of said disc, a valve member mounted between said disc and valve seat comprising an extreme peripheral portion formed on a radius in a plane at right angles to said valve seat and a closed bottom wall, said bottom wall and peripheral portion forming an upwardly opening recess adapted for cooperation with said cup to form a fluid check for said valve during its upward movement.

5. In a pump valve including a seat member having a valve seat, a valve mounted on said seat and having its upper face dished to form a fluid receptacle, a valve retaining spider detachably mounted on the seat member and having a top wall disposed in spaced parallel relation to said valve seat, and a downwardly depending inverted cup-shaped member on the lower face of said top wall adapted for cooperation with the dished face of the valve to form a fluid check for the valve, the outer periphery of said valve being formed on a radius in a plane at a right angle to the plane of the seat portion.

6. In a pump valve the combination of a seat member having two portions of different exterior diameters but coaxial with each other, the outer end of the smaller portion forming a valve seat, a valve mounted thereon and having its upper face dished to form a concentric fluid receptacle and its outer periphery formed on a radius in a plane at right angles to the plane of the seat portion, and a valve retaining spider in detachable engagement with the smaller exterior portion of said member having a centrally disposed top wall mounted in spaced parallel relation to said valve seat and having a downwardly opening cup on the under face of said top wall adapted for co-operation with the dish in said valve to form a fluid check therefor.

7. A pump valve comprising an annular fitting having an opening through the center thereof and being provided on its top side with a seat, a cage having an annulus engaging the fitting and surrounding the seat, arms rising from said annulus, the cage having a disc at the upper ends of the arms, said disc having a coaxial downwardly depending inverted cup on its under side, a cup-shaped valve member fitting loosely between the arms and having a portion of its under face adapted to engage the seat and being adapted to cooperate with the cup in the disc to form a fluid check for the valve during its upward movement, and having its extreme periphery formed on a radius in a plane at right angles to the valve seat engaging surface.

8. In a pump valve including a seat member and a valve retaining cage, said cage including a disc supported in spaced parallel relation to said valve seat and having a downwardly depending inverted cup on the lower face of the disc, a valve member therefor having its upper face dished for co-operation with the cup in the disc to form a fluid check and having its outer periphery formed on a radius in a plane at a right angle to the seat engaging face.

ALFRED E. EVANS.